United States Patent [19]
Armand et al.

[11] Patent Number: 4,742,127
[45] Date of Patent: May 3, 1988

[54] POLYCARBON SULPHIDE DERIVATIVES

[75] Inventors: Michel Armand, Echirolles; Mireille Fouletier; Pierre Degott, both of Grenoble, all of France

[73] Assignee: Societe Nationale Elf Aquitaine, Courbevoie, France

[21] Appl. No.: 889,198

[22] Filed: Jul. 25, 1986

Related U.S. Application Data

[62] Division of Ser. No. 740,919, Jul. 10, 1985.

[30] Foreign Application Priority Data

Sep. 20, 1983 [FR] France ................... 83 14940
Jun. 28, 1984 [FR] France ................... 84 10254

[51] Int. Cl.$^4$ ............................ C08F 8/34; C08F 8/26
[52] U.S. Cl. ................... 525/354; 525/326.1; 525/326.2; 525/343; 525/367
[58] Field of Search ............ 528/381, 386, 387, 388, 528/389; 525/343, 354, 364, 367

[56] References Cited

U.S. PATENT DOCUMENTS 4,188,469 2/1980 Fang ........................... 525/354

OTHER PUBLICATIONS

*Carbon*, vol. 19, pp. 175–186 (1981); "Preparation and Characterization of Carbon–Sulphur Surface Compounds;" by Chin H. Chang.

Primary Examiner—Christopher Henderson, Jr.
Attorney, Agent, or Firm—Oblon, Fisher, Spivak, McClelland & Maier

[57] ABSTRACT

Polycarbon sulphide derivatives comprise units $(R_xCS_m)_n$ in which

R represents hydrogen, an alkali metal or a transition metal, x is the degree to which R is present in the carbon-sulphur structure, m is the degree of substitution with sulphur and n is the number of units in the polymer chain.

As shown by the single FIGURE of the drawing, the insertion of R is reversible.

24 Claims, 1 Drawing Sheet

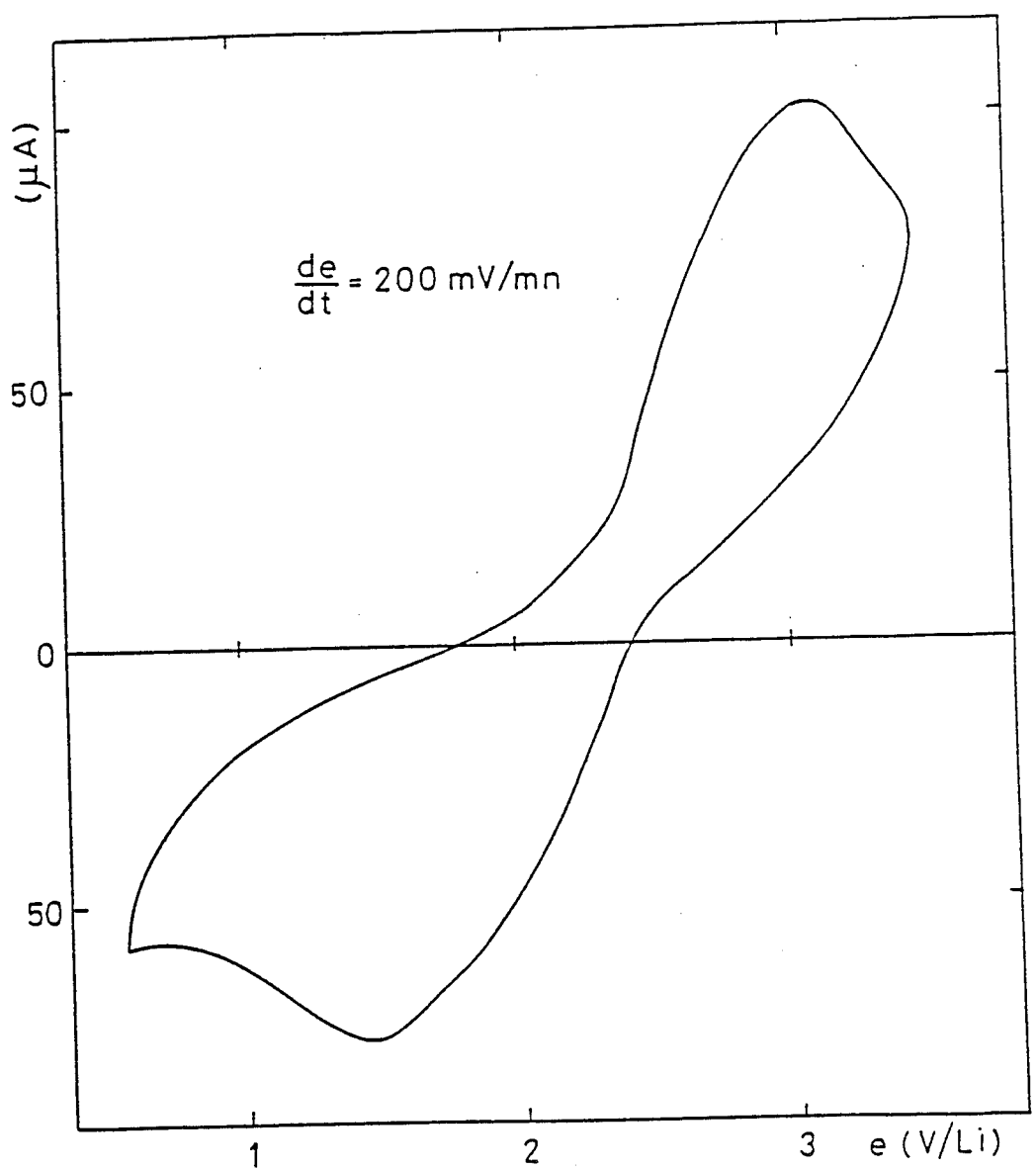

POLYCARBON SULPHIDE DERIVATIVES

This is a division of application Ser. No. 740,919, filed July 10, 1985, pending.

BACKGROUND OF THE INVENTION

1. Field of the Invention

The invention relates to new polycarbon sulphide derivatives, to the preparation thereof and to the application thereof, particularly in electrochemistry.

2. Discussion of Background

There have already been described in the review "Carbon", Vol. 19 page 175 et seq (1981), superficial complexes of carbon and sulphur which provide the possibility of establishing carbon-sulphur bonds at the surface of the carbon, thus forming superficial carbon-sulphur complexes.

However, given the high temperatures involved in their preparation, of the order of 500° C. to 800° C., the carbon chains are branched. This reduces the number of sites available to be sulphuretted. In this connection, examination of these compounds confirms that their sulphur content is a maximum of 40% this is considerably less than the theoretical value, resulting in a reduction in the capacity of these compounds per unit mass. Also, the high temperatures involved lead to excessive energy consumption.

Moreover, these materials include a significant proportion of thiolactones. The electrochemical reduction of these thiolacetones is difficult to reverse and this limits the performance of generators (cells) having electrodes made from these materials, such as those of the type $Li-(CS_y)_n$.

Study of the sulphuration of carbon chains by the present inventors has led to the conclusion that it is possible to fix sulphur at temperatures substantially less than those used hitherto and to develop a family of polycarbon sulphide compounds having a new structure.

SUMMARY OF THE INVENTION

It is an object of the invention to provide sulphuretted derivatives which are obtained in linear form and not in the form of superficial derivatives (complexes).

Another object of the invention is to provide a process for obtaining these derivatives, which is capable of being worked industrially by reason of its moderate cost and the ease of putting it into effect, at lower temperatures than in the processes used hitherto.

It is a further object of the invention to provide electrochemical applications for these derivatives and in particular, their use for making electrodes, especially for primary or secondary electrochemical generators (cells).

The derivatives provided by the invention are characterised in that they are polycarbon sulphides comprising units of the formula

$(R_xCS_m)_n$   I in which:
R represents H, an alkali metal, in particular Li, Na, K, a transition element such as Ag, Zn, Cu, Co or the like;
x corresponds to the degree to which R is present in the carbon-sulphur structure and has a value from 0 to m/(valency of the metal) (these values being inclusive);
m represents the degree of substitution with sulphur, with $0<m\leq1$ and
n represents the number of units present in the polymeric carbon chain.

DETAILED DESCRIPTION OF THE PREFERRED EMBODIMENTS

Examination of the above derivatives shows that when subjected to IR analysis, they have an absorption peak at about 1630 cm$^{-1}$, which corresponds to the characteristic value for conjugated systems.

This observation leads us to suggest a conjugated structure of the type:

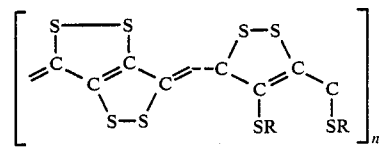

When x is other than 0, the compounds of the invention have the element R inserted in the above structure, which thus plays the role of a receptor structure.

The preferred values of x are greater than 0.5 and vary up to the stoichiometric value for the product.

Advantageously, this insertion is reversable and the elements R which are inserted can be released without altering substantially the structure of the polymer chain.

In a preferred family of compounds according to the invention, the inserted elements are alkali metals, Li and Na being preferred because of their capacity to diffuse rapidly in the solid phase and because of their low equivalent mass.

In another preferred family, R represents a transition metal such as Ag, Cu, Zn, Co and the like. Advantageously, these elements may be in effect retained in the carbon-sulphur host structure of the compounds of the invention and this allows one to effect, for example, the recovery of transition metals from dilute solutions, in particular industrial effluents.

The invention also embraces polycarbon sulphides which do not have inserted elements and which thus constitute, according to one very important aspect of the invention, starting materials for the insertion of various elements.

According to a modification of the invention, the polycarbon sulphides also contain polyacetylene units and are thus in the form of copolymer of a polycarbon sulphide such as represented by the formula I and a polyacetylene, the said copolymer being represented by the formula II:

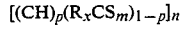

$[(CH)_p(R_xCS_m)_{1-p}]_n$ in which formula R, x, m have the same meaning as in formula I; $0<p\leq1$ and n represents the number of units in the chain.

The new derivatives according to the invention may be represented by the following structural formula III

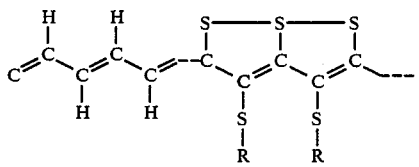

The formula III clearly shows that this is a product of the copolymer type.

Advantageously, the inserted element R may be an alkali metal, for example lithium or sodium, but it may also be a transition element selected from silver, copper, zinc and cobalt.

The invention also relates to a process for the preparation of the polycarbon sulphide derivatives defined above.

According to this process, sulphur or a derivative capable of releasing sulphur is reacted with a reduced polycarbon compound.

This may be a polycarbon such as is obtained after reduction of a halogenated polycarbon such as polytetrafluoroethylene or PTFE under the action of an alkali metal.

It is believed that this reduction reaction leads to a reduced polycarbon formed from linear carbon chains. These chains comprise units of the structure —$CM_z$— in which:

M represents an alkali metal and
z represents the degree to which the alkali metal is present in the carbon chain.

In order to obtain a high degree of sulphur substitution and if desired, to attain the stoichiometric limit, an appropriate amount of sulphur is used and advantageously the addition reaction is carried out at high temperature, but under conditions which will ensure that there is no change in the carbon-sulphur bonds which are formed and that there is no branching of the chains of the initial polymer. Temperatures up to about 350° C. preferably of the order of 150° C. to 200° C. are suitable for obtaining the desired degree of sulphuration.

In accordance with a preferred embodiment of the invention, the sulphuration reaction is carried out in the presence of a sulphuration catalyst.

A lower degree of substitution of sulphur in the polycarbon chains is obtained by operating at temperatures below about 120° C., possibly in the absence of a catalyst.

According to a preferred mode of carrying the invention into effect, polycarbon chains having a high sulphur content which may exceed 70% by weight of sulphur are obtained by first submitting the reduced polymer to a re-oxidation step under the action of an amount of sulphur less than the stoichiometric amount, operating at a temperature close to ambient, and the resulting product is then treated with an appropriate amount of sulphur at a higher temperature, as indicated above.

Thus in order to prepare a polycarbon sulphide derivative containing sulphur in substantially the stoichiometric quantity, it is advantageous to proceed as follows.

As the starting polycarbon, there is employed a reduced polymer comprising units of the structure $CM_z$— as indicated above. This polymer is advantageously obtained by the action of a reducing agent, more particularly an alkali metal M or a derivative capable of releasing M under the reaction conditions, on a halogenated carbon polymer, that is to say a polymer formed of linear carbon chains substituted with halogens.

These halogens are preferably selected from fluorine and chlorine.

The preferred polymers are polychlorotrifluorethylene and more particularly PTFE.

The alkali metal is preferably constituted by lithium, potassium or sodium.

The reduction reaction is preferably carried out at ambient temperature or a temperature close to ambiant and in an organic solvent medium.

Appropriate organic solvents are those which are strong donor media and comprise tetrahydrofuran (THF), dimethylformamide (DMF), tetramethylethylenediamine (TMDA) and homologues thereof and/or mixtures of TMDA or its homologues with solvents of the aromatic type such as benzene or toluene.

According to an advantageous embodiment of the invention, the reaction medium contains a catalytic amount of a polyaromatic compound.

Numerous polyaromatic compounds are capable of being reduced reversibly by alkali metals, in a strong donor medium.

By way of example there may be mentioned naphthalene, triphenylene, phenanthrene, benz (a) pyrene, pyrene, benz (a) anthracene, 9,10-dimethylanthracene, anthracene, benz (e) pyrene, acenaphthylene, fluoranthene, perylene.

The use of a polyaromatic compound as an intermediary in the reaction permits, in particular, the reduction reaction to be carried out at a constant potential and the completion of the reaction to be monitored, since the reaction medium containing this compound decolorises after the alkali metal has been consumed.

Thus, for example, the reduction of naphthalene and its solution in THF by means of lithium gives rise to an anion radical of green colour; the reduction of benzophenone by increasing quantities of lithium leads successively to an anion radical (blue) and then to a dianion (red).

The degree to which z is present in the units of the structure —$(CM_z)$— is a function of the amount of alkali metal which is introduced and of the redox reaction used.

The amount of alkali metal must be at least sufficient to permit the desired stoichiometric level to be attained.

Generally an excess is used in order to attain the stoichiometric limit.

The polyaromatic compound is advantageously used in a molar ratio of 0.1 to 50%, and preferably in the molar ratio of 1 to 10% per polymer unit.

For example, the reduction of PTFE by naphthalene-lithium in excess leads to a degree of insertion of the order of 25%.

It is believed that the reduction reaction leads to duplication of the carbon chains, with the carbon atoms being arranged in the form of aromatic cyclic groups.

The reduced polymer which is obtained is next subjected to the action of sulphur or a derivative capable of releasing sulphur, such as organic or alkali metal polysulphides or alternatively sulphur halides.

This oxidation step is also carried out at ambient temperature and leads to fixing of the order of 10 to 25% by weight of the sulphur.

In order to obtain a higher degree of sulphuration, the oxidised polymer is subjected to the action of a sulphuretting agent such as indicated above, operating at a higher temperature, advantageously of the order of 150° to 200° C.

The high temperature sulphuretting reaction is advantageously carried out in the presence of a catalyst, more particularly a vulcanisation catalyst such as thiruram dimethyl disulphide (or diethyl disulphide) or zinc dithiocarbamate or in general, any compound which facilities the formation of carbon-sulphur bonds.

After sulphuration, it is advantageous to remove by washing, the by-products which have been formed. These by-products are constituted primarily by alkali metal halides which are formed during reduction of the halogenated polymer.

It is also possible to use an agent which permits complexes to be formed from the by-products and/or the excess alkali metal.

The purified sulphuretted products are dried under vacuum at temperatures of the order of about 200° C.

According to a modification of the process of the invention, the insertion of R into the polycarbon sulphide structure is obtained by the electrochemical route. This operation is carried out by known techniques.

According to another modification, the polycarbon sulphide is exposed simultaneously to the ion which it is desired to insert and an appropriate reducing agent which enables the polycarbon structure to be reduced under conditions which permit the desired insertion into the carbon-sulphur compound.

Among suitable reducing agents, hydrogen, potassium borohydride and sodium diphenyl may be mentioned.

According to another method of carrying out the invention, polycarbon sulphides may be obtained by grinding a fluorinated polymer in the presence of an alkali metal or a transition element in an inert liquid, and then effecting the sulphuration of the product obtained, by reaction with sulphur or a derivative capable of releasing sulphur.

According to preferred modes of carrying out the invention, the polymer used is a poly(tetrafluoroethylene) or a poly(tetrafluorochloroethylene).

The sulphuration may be effected at ambient temperature and this permits fixing of sulphur of the order of 10 to 25% (by weight relatively to the weight of the sulphuretted units).

In order to obtain better fixing of sulphur, sulphuration can be carried out at a higher temperature of the order of 150° to 200° C. in the presence of a sulphuretting agent, for example an organic polysulphide an alkali metal polysulphide or a sulphur halide. In these cases of high temperature sulphuration, one of the customary vulcanisation catalysts can be used.

The copolymers of polycarbon sulphide and polyacetylene represented by formula II may be obtained directly by sulphuration of the polyacetylene or a precursor thereof, by means of sulphur or derivatives thereof.

For example, one can start from polyvinyl chloride and sulphuration can be effected at ambient temperature or at a higher temperature of the order of 200° to 300° C., in the presence of sulphur chloride.

The products according to the invention, regardless of whether they are in the form of formula I or formula II may have a very high content of sulphur. For this reason, it is sufficient to carry out a supplementary step of sulphuration by means of a sulphur halide or by means of sulphur per se. In this way, products in which $x=0$ can be obtained.

Particularly because of their high conductivity, the derivatives of the invention can advantageously be used as materials for making electrodes.

Advantageously, the derivatives of the invention may have, as already indicated, a high degree of substitution with sulphur and also an extremely low equivalent mass.

Moreover, because of their high conductivity these derivatives, both the host structures and the compounds which are inserted, can advantageously be used in primary and secondary electrochemical generators (cells) which have anodes containing alkali metals of the Na or Li type. Because of their properties, these materials give better performance than is obtained with the carbon-sulphur products known hitherto.

In particular, it is possible by using binders of the polymer type, to construct electrodes which can be used in aqueous media, for the selective recovery of transition metals, from industrial effluents for example.

The following Examples illustrate the manner in which the process of the invention can be carried out.

EXAMPLE 1

Preparation of polycarbon sulphides $(R_xCS_m)_n$ in which R=H and Li and m=0.10

2.010 g (20.10 mM) of PTFE is suspended in THF and reduced by means of lithium (636 mg or 91 mM) in the presence of 186 mg of naphthalene. The reaction lasts for about a week.

184 mg (5.8 mM) of sulphur is then added and after filtration, the solid products are washed with THF and then with acetonitrile. In order to form a complex with the lithium fluoride contained in the sulphuretted product, 13.5 cc of boron trifluoride diethyl ether $BF_3.O(C_2H_5)_2$ is added.

The solid products are then washed with acetonitrile and dried under vacuum at 200° C.

Composition: C: 55.48%; H: 2.26%; S: 15.44%; F: 17.15%; Li: 1.02%; B: 2.55% (total: 93.90%).

The excess of boron trifluoride diethyl ether can be removed by washing with water.

EXAMPLE 2

Preparation of polycarbon sulphides $(R_xCS_m)_n$ in which R=H, x=0.055 and m=0.035 or R=H, x=0.074 and m=0.08

2.100 g (21 mM) of PTFE is suspended in THF and reduced by means of 3.656 g (93.7 mM) of potassium in the presence of 363 g of naphthalene and a selective complexing agent for potassium, namely 18-dicyclohexyl-crown 6 (626 mg). The reaction lasts for about fifteen days. 1.616 g (50.5 mM) of sulphur is added to the suspension; the solid products are then filtered and washed with THF followed by acetonitrile and then dried.

An aliquot of the previous product (3.15 g) is mixed with 725 mg of sulphur and raised to 170° C. in a hermetically sealed vessel. After reaction (15 hours) the product is washed with distilled water and then treated under vacuum at 200° C.

C: 44.93; H: 2.06; S: 42.63; K: 2.74; F: 3.26 (total: 95.64%).

IR: 2930-2850-1630-1450-1360-1240-1140-1090-1040-290-620.

Another aliquot (3.00 g) is washed with distilled water and then with acetone under vacuum at 200° C.

Composition: C: 60.66%; H: 3.76%; S: 13.03%; F: 6.26%; K; 2.95% (total: 86.66%).

EXAMPLE 3

Preparation of carbon polysulphide in which R=H, x=0.19 and m=0.89.

1.010 g (10.1 mM) of PTFE in suspension in THF is reduced by means of 1.652 g (42.4 mM) of potassium in the presence of 200 mg of naphthalene. After reaction (15 days) 711 mg (22.2 mM) of sulphur and dimethylthiuram disulphide is added to the solution. After several days of reaction, the solid products are separated and mixed with 646 mg of sulphur (20.2 mM) and raised during a period of 15 hours to 200° C. in a hermetically sealed vessel.

The products obtained are washed with distilled water and then with acetone and treated under vacuum at 200° C.

Composition: C: 27.51; H: 0.44; K: 1.04; F: 5.27; S: 64.70 total 99.06%

IR: 3400-3100 (?)-2900 (?)-2320-1640-1500-1340 cm$^{-1}$.

EXAMPLE 4

Study of the electrochemical behaviour of the polymer of Example 3

A cell is used having the following solid electrolyte $$Li/(POE)_8, LiClO_4/(H_{0.19}CS_{0.89})_n$$

POE represents a unit of polyethylene oxide. The operation is carried out at 85° C.

As indicated by the graph shown in the single FIGURE of the accompanying drawing, by measurement of the cyclic voltage, there is obtained a curve which is perfectly stable during the course of successive cycles.

The potential at which the system relapses (2.33 V) is very close to the potential e(i=O) observed during the return sweep of the curve (product reoxidised). This potential is slightly less than that of the couple Li$_2$S/S:

e=2.48 V (compared with Li/Li$^+$)

EXAMPLE 5

Use of the product of Example 3 for the recovery of Ag 0.5 g of the material prepared according to Example 3 is mixed with 0.2 ml of a suspension of PTFE in order to form an electrode, by applying it under pressure to a stainless steel grid. A current of 10 mA is applied between this electrode and a graphite counter-electrode immersed in a solution of 10$^{-3}$M of Ag$^+$. The current is applied for 15 hours. The residual concentration of Ag$^+$ in the solution is then less than 10$^{-5}$ moles/liter.

EXAMPLE 6

Preparation of a compound of the type R$_x$CS$_m$ 2 g of polytrifluorochoroethylene PTFCE and 0.53 g of lithium are ground in the presence of 20 cc of hexane for 45 mins. in a ball-mill. The reaction product is filtered and dried under argon and mixed with 1.1 g of sulphur, and then heated in a sealed container to 250° C. The final product is washed with water in order to remove alkali metal salts. The product obtained corresponds to the following formula:

$$CS_{0.98}H_{0.009}$$

EXAMPLE 7

Preparation of a copolymer of formula II by sulphuration of polyacetylene 1 g of polyacetylene is treated at 220° C. with 1.3 g of sulphur monochloride vapour. The product obtained corresponds to the formula $$[(CH)_{0.76}CS_{0.24}]_n$$

We claim:

1. A process for the preparation of a polycarbon sulfide compound which comprises units of the formula:

$$-(R_xCS_m)_n- \qquad (I)$$

wherein:
R is a hydrogen atom, a lithium atom, a sodium atom, a potassium atom, a silver atom, a copper atom, a zinc atom, or a cobalt atom;
x is the degree to which R is present in the carbon-sulfur structure and has a value of from 0 to m/(valency of the metal), these values being inclusive;
m represents the degree of substitution with sulfur, with $0 < m \leq 1$; and
n represents the number of units in the polymeric carbon chain, said process comprising:
reacting a reduced polycarbon compound formed by linear carbon chains comprising units of the formula:

$$-(CM)_z-$$

wherein M is a lithium atom, a sodium atom, a potassium atom, a silver atom, a copper atom, a zinc atom, or a cobalt atom and z represents the degree to which said lithium, sodium, potassium, silver, copper, zinc, or cobalt atom is present in the carbon chain, with sulfur, an organic polysulfide, an alkali metal sulfide, or a sulfur halide, at a temperature of up to 350° C.

2. The process of claim 1, comprising using a molar excess of sulphur relative to the units of the formula —(CM)$_z$—.

3. The process of claim 1, comprising using a temperature of from 150° C. to 200° C.

4. The process of claim 1, comprising using a catalyst.

5. The process of claim 1, comprising using a temperature below 120° C.

6. The process of claim 1, comprising first submitting the reduced polycarbon compound to an oxidation step by exposing the polycarbon compound to an amount of sulphur less than a stoichiometric amount, at a temperature in the region of ambient temperature to obtain a product which is then treated with sulphur at a higher temperature of up to 350° C.

7. The process of claim 6, wherein the said higher temperature is a temperature of from 150° and 200° C.

8. A process for the preparation of a polycarbon sulfide compound comprising units of the formula:

$$-(R_xCS_m)_n- \qquad (I)$$

wherein:

R is a hydrogen atom, a lithium agent, a sodium atom, a potassium atom, a silver atom, a copper atom, a zinc atom, or a cobalt atom;

x is the degree to which R is present in the carbon-sulfur structure and has a value of from 0 to m/(valency of the metal), these values being inclusive;

m represents the degree of substitution with sulfur, with $0 < m \leq 1$; and n represents the number of units in the polymeric carbon chain; said process comprising:

reducing a halogenated polycarbon under the action of lithium, sodium, potassium, silver, copper, zinc, or cobalt to obtain a reduced polycarbon compound formed by linear carbon chains comprising units of the formula:

$$-(CM)_z-$$

wherein M is a lithium atom, a sodium atom, a potassium atom, a silver atom, a copper atom, a zinc atom, or a cobalt atom, and z is the degree to which said lithium, sodium, potassium, silver, copper, zinc, or cobalt atom is present in the carbon chain; and reacting the reduced polycarbon with sulfur, an organic polysulfide, an alkali metal sulfide, or a sulfur halide, at a temperature of up to 350° C.

9. The process of claim 8, comprising reacting the reduced polycarbon with sulfur, an organic polysulfide, an alkali metal sulfide, or a sulfur halide at a temperature of from 150° to 200° C.

10. The process of claim 8, comprising reacting the reduced polycarbon with sulfur, an organic polysulfide, an alkali metal sulfide, or a sulfur halide in the presence of a catalyst.

11. The process of claim 8, comprising reacting the reduced polycarbon with sulfur, an organic polysulfide, an alkali metal sulfide, or a sulfide halide at a temperature below 120° C.

12. The process of claim 1, wherein R is lithium, sodium, or potassium.

13. The process of claim 8, wherein R is lithium, sodium or potassium.

14. The process of claim 1, wherein R is silver, zinc, copper or cobalt.

15. The process of claim 8, wherein R is silver, zinc, copper, or cobalt.

16. The process of claim 1, comprising reacting the reduced polycarbon with sulfur, an organic polysulfide, an alkali metal sulfide, or a sulfur halide in the presence of a catalyst comprising naphthalene, triphenylene, phenanthrene, benz (a) pyrene, pyrene, benz (a) anthracene, 9,10-dimethylanthracene, anthracene, benz (e) pyrene, acenaphthylene, fluranthene, or perylene.

17. The process of claim 8, comprising reacting the reduced polycarbon compound with sulfur, an organic polysulfide, an alkali metal sulfide, or a sulfur halide in the presence of a catalyst, said catalyst comprising naphthalene, triphenylene, phenanthrene, benz (a) pyrene, pyrene, benz (a) anthracene, 9,10-dimethylanthracene, anthracene, benz (e) pyrene, acenaphthylene, fluranthene, or perylene.

18. A process for the preparation of a linear sulphuretted carbon compound of the formula:

$$-(R_xCS_m)_n- \qquad (I)$$

wherein:

R is a hydrogen atom, a lithium atom, a sodium atom, potassium atom, a silver atom, a copper atom, a zinc atom, or a cobalt atom;

x is the degree to which R is present in the carbon-sulfur structure and has a value from 0 to m/(valency of the metal), these values being inclusive;

m is the degree of substitution with sulfur, with $0 < m \leq 1$; and n represents the number of units in the polymeric carbon chain;

said process comprising grinding a fluorinated polymer in the presence of lithium, sodium, potassium, silver, copper, zinc, or cobalt, in an inert liquid, and then reacting the product obtained with sulfur, an organic polysulfide, an alkali metal sulfide, or a sulfur halide to effect the sulphuration of the product obtained.

19. The process of claim 8, comprising first oxidizing the reduced polycarbon compound under the action of an amount of sulphur less than a stoichiometric amount, at a temperature in the region of ambient temperature to obtain a product which is then treated with sulphur at a higher temperature of up to 350° C.

20. The process of claim 19, wherein the said higher temperature is a temperature in the range of 150° C. to 200° C.

21. The process of claim 8, wherein the said halogenated polycarbon is polytetraflurethylene.

22. The process of claim 8, wherein the said halogenated polycarbon is polychlorotriflurethylene.

23. The process of claim 18, wherein the said fluorinated polymer is poly(tetrafluoroethylene).

24. The process of claim 18, wherein the said fluorinated polymer is poly(chlorotrifluoroethylene).

* * * * *

UNITED STATES PATENT AND TRADEMARK OFFICE
CERTIFICATE OF CORRECTION

PATENT NO. : 4,742,127
DATED : MAY 3, 1988
INVENTOR(S) : MICHEL ARMAND ET AL

It is certified that error appears in the above-identified patent and that said Letters Patent is hereby corrected as shown below:

Column 1, line 32, delete "thiolacetones" and insert --thiolactones--.

Column 5, line 6, delete "ram" and insert --ame--.

Column 5, line 8, delete "facilities" and insert --facilitates--.

Column 10, line 44, delete "polytetraflurethylene" and insert --polytetrafluoroethylene--.

Column 10, line 46, delete "polychlorotriflurethylene" and insert --polychlorotrifluoroethylene--.

Signed and Sealed this

Ninth Day of May, 1989

Attest:

DONALD J. QUIGG

*Attesting Officer*　　　*Commissioner of Patents and Trademarks*